United States Patent
Nawa et al.

(10) Patent No.: US 6,735,167 B1
(45) Date of Patent: May 11, 2004

(54) ORTHOGONAL TRANSFORM PROCESSOR

(75) Inventors: Toshihiko Nawa, Kanagawa (JP); Hideto Furukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 775 days.

(21) Appl. No.: 09/709,214

(22) Filed: Nov. 9, 2000

(30) Foreign Application Priority Data

Nov. 29, 1999 (JP) .......................................... 11-337023

(51) Int. Cl.$^7$ ................................................. H04J 11/00
(52) U.S. Cl. ....................... 370/208; 370/210; 375/142; 375/240.07; 375/240.18; 708/400
(58) Field of Search ................................ 370/203, 204, 370/208, 210, 249, 394, 537; 375/137, 140–153, 221, 240.07, 240.05, 240.18; 708/400–410, 422, 426, 820

(56) References Cited

U.S. PATENT DOCUMENTS 5,805,484 A * 9/1998 Ikeda et al. ................ 708/403
6,408,319 B1 * 6/2002 Cambonie .................. 708/406
6,683,906 B1 * 1/2004 Iwamatsu .................. 375/142

FOREIGN PATENT DOCUMENTS

| JP | 6-282563 | 10/1994 |
| JP | 6-301711 | 10/2000 |

* cited by examiner

*Primary Examiner*—Dang Ton
*Assistant Examiner*—Tri H. Phan
(74) *Attorney, Agent, or Firm*—Katten Muchin Zavis Rosenman

(57) ABSTRACT

An orthogonal transform processor which can be implemented in simple hardware. A data reception unit accepts a pair of source data values at intervals of T. For each given pair of source data values, an adder/subtractor performs addition and subtraction at intervals of T/n, where n is an integer representing the order of the orthogonal transform algorithm being implemented. The resultant data values are stored in some predetermined storage locations defined in a storage unit. A feedback unit reads out such stored data values from the storage unit and feeds them back to the adder/subtractor. When the intended operation stages are finished, a data output unit reads out the data from the storage unit and sends them out as the final result values.

4 Claims, 20 Drawing Sheets

| | |
|---|---|
| w'0=w0+w1 | w'1=w0−w1 |
| w'2=w2+w3 | w'3=w2−w3 |
| w'4=w4+w5 | w'5=w4−w5 |
| w'6=w6+w7 | w'7=w6−w7 |
| w'8=w8+w9 | w'9=w8−w9 |
| w'10=w10+w11 | w'11=w10−w11 |
| w'12=w12+w13 | w'13=w12−w13 |
| w'14=w14+w15 | w'15=w14−w15 |

FIG. 7

| | |
|---|---|
| $w''0 = w'0 + w'2$ | $w''1 = w'1 + w'3$ |
| $w''2 = w'0 - w'2$ | $w''3 = w'1 - w'3$ |
| $w''4 = w'4 + w'6$ | $w''5 = w'5 + w'7$ |
| $w''6 = w'4 - w'6$ | $w''7 = w'5 - w'7$ |
| $w''8 = w'8 + w'10$ | $w''9 = w'9 + w'11$ |
| $w''10 = w'8 - w'10$ | $w''11 = w'9 - w'11$ |
| $w''12 = w'12 + w'14$ | $w''13 = w'13 + w'15$ |
| $w''14 = w'12 - w'14$ | $w''15 = w'13 - w'15$ |

FIG. 8

| | |
|---|---|
| $w'''0 = w''0 + w''4$ | $w'''1 = w''1 + w''5$ |
| $w'''2 = w''2 + w''6$ | $w'''3 = w''3 + w''7$ |
| $w'''4 = w''0 - w''4$ | $w'''5 = w''1 - w''5$ |
| $w'''6 = w''2 - w''6$ | $w'''7 = w''3 - w''7$ |
| $w'''8 = w''8 + w''12$ | $w'''9 = w''9 + w''13$ |
| $w'''10 = w''10 + w''14$ | $w'''11 = w''11 + w''15$ |
| $w'''12 = w''8 - w''12$ | $w'''13 = w''9 - w''13$ |
| $w'''14 = w''10 - w''14$ | $w'''15 = w''11 - w''15$ |

FIG. 9

| | |
|---|---|
| FHT0=w'''0+w'''8 | FHT1=w'''1+w'''9 |
| FHT2=w'''2+w'''10 | FHT3=w'''3+w'''11 |
| FHT4=w'''4+w'''12 | FHT5=w'''5+w'''13 |
| FHT6=w'''6+w'''14 | FHT7=w'''7+w'''15 |
| FHT8=w'''0−w'''8 | FHT9=w'''1−w'''9 |
| FHT10=w'''2−w'''10 | FHT11=w'''3−w'''11 |
| FHT12=w'''4−w'''12 | FHT13=w'''5−w'''13 |
| FHT14=w'''6−w'''14 | FHT15=w'''7−w'''15 |

FIG. 10

ORTHOGONAL TRANSFORM PROCESSOR

BACKGROUND OF THE INVENTION

1. Field of the Invention

The present invention relates to an orthogonal transform processor, and more particularly, to an orthogonal transform processor which employs a fast orthogonal transform algorithm to process a series of source data values.

2. Description of the Related Art

Digital signal processing applications often involve orthogonal transform algorithms such as the Fast Fourier Transform (FFT) and Fast Hadamard Transform (FHT). Particularly, FHT is frequently used in the technical fields of image processing and mobile communication because it can be implemented with simple hardware.

FIG. 12 shows how to generate Hadamard matrices. As seen from FIG. 12, Hadamard matrices are symmetric matrices consisting of ones and zeros. Their row vectors, referred to as the "Walsh codes," are orthogonal to every other row vector. The generation process shown in FIG. 12 may be repeated in the same manner to yield higher-order matrices, e.g., 8×8, 16×16, 32×32, 64×64, and so on.

As just stated above, Walsh codes are orthogonal to each other. A code sequence having such an orthogonal nature is useful in modulating, or encoding, transmission signals. This technique is known as the "orthogonal modulation." When the code sequence consists of M orthogonal codewords, the modulation is called the "M-ary orthogonal modulation."

FIG. 13 is a diagram which shows an example of an M-ary orthogonal modulator using the Walsh code set of M=4. It is a common convention to designate each individual Walsh code by a unique number that starts with zero, such as 0, 1, 2, and 3, denoting the zeroth, first, second, and third Walsh codes, respectively. In the example modulator configuration of FIG. 13, these four Walsh codes are subjected to a selector SW1 being controlled by source data to be modulated. The selector SW1 chooses a Walsh code corresponding to each symbol of the source data sequence and sends it out as the encoded data. A source data symbol "01," for example, causes the selector SW1 to choose and output the Walsh code 1, namely "0101."

The inherent orthogonality of Walsh codes is also used to reconstruct the original data from a modulated data sequence that was produced as above. That is, the data is decoded by computing its correlation with each Walsh code. FIG. 14 is a diagram which shows an example of a Walsh decoder. As seen from FIG. 14, the decoder comprises four correlators 1-1 to 1-4 and a maximum value selector 2. The correlators 1-1 to 1-4 calculate correlation factors between the modulated source data signal and four different Walsh codes concurrently. The maximum value selector 2 selects one of the calculated correlation factors that exhibits the greatest value.

FIG. 15 provides a typical structure of the correlator 1-4 for Walsh code 3 ("0110"). This illustrated correlator 1-4 comprises flip-flops (FFs) 10-1 to 10-4, multipliers 11-1 to 11-4, and an adder 12. The flip-flops 10-1 to 10-4 function as delay elements, giving a one-clock delay to their respective input signals. The multipliers 11-1 to 11-4 calculate the product of each bit of the Walsh code 3 and their input data supplied from the corresponding flip-flops 10-1 to 10-4. In this multiplication processing, the bit values "0" and "1" are interpreted as bipolar levels "+1" and "−1," respectively.

The resultant products are then summed up by the adder 12. In the example of FIG. 15, the correlator outputs a maximum correlation value when the input data sequence is "0110" (i.e., "+1, −1, −1, +1").

The above function of Walsh correlators explains the principle of the decoder of FIG. 14. That is, the decoder reproduces the original data by calculating the correlations between input data and different Walsh codes, finding which correlator indicates the highest correlation, and then outputting the corresponding symbol.

Referring again to FIG. 15, the illustrated correlator employs multipliers to determine whether the input data sequence coincides with a specific orthogonal codeword. Multipliers, however, generally needs a complex circuit structure, which results in an increased scale of hardware. This problem in correlative operations can be avoided by using adders and subtractors, in place of multipliers. FHT operators are known as an example of such correlators. In the FHT computation, correlation can be calculated with simple adders and subtractors, or butterfly operators, which are the fundamental components of Fast Fourier Transform.

FIG. 16(A) is a signal flow diagram which shows the FHT computation based on 2×2 Hadamard matrix (i.e., Walsh code length=2). This diagram represents the summation and subtraction of two input signals w0 and w1 The resultant sum and difference are referred to herein as Walsh0 and Walsh1, respectively.

$$w0+w1=\text{Walsh0} \tag{1}$$

$$w0-w1=\text{Walsh1} \tag{2}$$

Actually, the above 2×2 FHT operation is realized by a combination of an adder 20-1 and a subtractor 20-2, as shown in FIG. 16(B).

When the Walsh code 1 itself (w0=+1, w1=−1) is given as an input, the FHT operator of FIG. 16(B) will output the following results (see FIG. 17).

$$\text{Walsh0}=w0+w1=(+1)+(-1)=0 \tag{3}$$

$$\text{Walsh1}=w0-w1=(+1)-(-1)=2 \tag{4}$$

That is, the FHT operator outputs an auto-correlation value of "2" at its lower output terminal corresponding to the Walsh code 1. Similarly, the FHT operator will produce the following correlation values when the Walsh code 0 itself (w0=+1, w1=+1) is given.

$$\text{Walsh0}=w0+w1=(+1)+(+1)=2 \tag{5}$$

$$\text{Walsh1}=w0-w1=(+1)-(+1)=0 \tag{6}$$

In this second example, the illustrated FHT operator outputs an auto-correlation value of "2" at its upper output terminal corresponding to the Walsh code 0.

FIG. 18 is a signal flow diagram showing the FHT computation based on 4×4 Hadamard matrix (i.e., Walsh code length=4). Consider, for example, that the Walsh code 3 itself (w0=+1, w1=−1, w2=−1, w3=+1) is given as an input. In this case, the result will be as follows:

$$\begin{aligned} walsh0 &= w0 + w1 + w2 + w3 \\ &= (+1) + (-1) + (-1) + (+1) = 0 \end{aligned} \tag{7}$$

$$\begin{aligned} walsh1 &= w0 - w1 + w2 - w3 \\ &= (+1) - (-1) + (-1) - (+1) = 0 \end{aligned} \tag{8}$$

-continued $$walsh2 = w0 + w1 - w2 - w3 \quad (9)$$
$$= (+1) + (-1) - (-1) - (+1) = 0$$

$$walsh3 = w0 - w1 - w2 - w3 \quad (10)$$
$$= (+1) - (-1) - (-1) + (+1) = 4$$

That is, the illustrated operator outputs an auto-correlation value of "4" at its output terminal corresponding to the Walsh code 3.

The above-described FHT computation may be implemented directly in hardware, using adders and subtractors. This simple approach, however, is not realistic particularly when the code length is long, because of the intolerable propagation delay times resulting from its cascaded stages of adders and subtractors. To solve this problem, most implementations use the techniques of pipelined processing.

FIG. 19 is a timing diagram of typical pipelined processing when the code length is four. This processing can be realized by a circuit shown in FIG. 20. The circuit comprises flip-flops (FFs) 50 to 56, butterfly operators 57 and 58, rearrangement switches 59 and 60, a selector 61, and an operation timing generator 62.

The flip-flops 50 to 56 delay their input data by a predetermined time. The butterfly operators 57 and 58 perform a butterfly operation with the supplied data. The rearrangement switches 59 and 60 change the order of the supplied data as required. The selector 61 selects either the output of the flip-flop 56 or the lower-terminal output of the rearrangement switch 60. Based on a framing pulse signal that indicates the boundaries of individual data blocks, the operation timing generator 62 controls the components in the processor so that they will be timed correctly.

The processor circuit of FIG. 20 will operate as follows. Referring to (A) of FIG. 19, every falling edge of the framing pulse signal initiates a new cycle of operation. Referring to (B) of FIG. 19, the source data is supplied to the flip-flop 50, and then it reaches the input of the flip-flop 51 after one clock interval (i.e., one data interval). Operating at half the clock rate, the flip-flops 51 and 52 take in w0 (delayed) and w1 and hold them for two clock cycles. As a result, the butterfly operator 57 is supplied with the source data values w0 and w1 at the same time, as shown in (c) of FIG. 19. The butterfly operator 57 calculates their sum w0' and difference w1' according to the following formulas.

$$w0'=w0+w1 \quad (11)$$
$$w1'=w0-w1 \quad (12)$$

The subsequent source data values w2 and w3 are processed in the same way, resulting in the following values w2' and w3'.

$$w2'=w2+w3 \quad (13)$$
$$w3'=w2-w3 \quad (14)$$

The flip-flop 53 delays the output data of the butterfly operator 57 by two clock intervals. The processed data is fed to the rearrangement switch 59 in the following order. First, the rearrangement switch 59 accepts w0' at its upper input terminal. Two clocks later, w2' and w1' arrive at the upper and lower input terminals, respectively. Lastly, the rearrangement switch 59 receives w3' at its lower input terminal. While passing w0' and w3' straight to the next stage, the rearrangement switch 59 swaps w2' and w1' internally. The flip-flop 54 is located at the upper output terminal of the rearrangement switch 59, adding a two-clock delay to that output data. As a result, the second butterfly operator 58 first receives w0' and w2', and then w1' and w3'. It calculates their sums and differences according to the following formulas, as shown in (D) of FIG. 19.

$$w0''=w0'+w2' \quad (15)$$
$$w2''=w0'-w2' \quad (16)$$
$$w1''=w1'+w3' \quad (17)$$
$$w3''=w1'-w3' \quad (18)$$

The resultant values w2' and w3' appear at the lower output terminal of the butterfly operator 58. The flip-flop 55 feeds them to the rearrangement switch 60, with a delay of two clock intervals. Accordingly, the rearrangement switch 60 receives the processed data in the following order. First, the rearrangement switch 60 accepts w0'' at its upper input terminal. Then, w1'' and w2'' arrive at the upper and lower input terminals, respectively. Lastly, w3' is fed to the lower input terminal. While passing w0'' and w3'' straight to the next stage, the rearrangement switch 60 swaps w1'' and w2'' internally at the above second step. The flip-flop 56 delays the data supplied from the rearrangement switch 60 by two clock intervals. As a result, the selector 61 first receives w0'' and w1'', and then w2'' and w3'' at its upper and lower terminals. Alternately changing its contact position at every clock transition, the selector 61 outputs the four values w0'', w1'', w2'', w3'' in this order, as shown in (E) of FIG. 19.

As described above, the conventional architecture for FHT processing can be implemented with simple logic circuits as long as it is for short codewords. In real-life applications, however, the conventional FHT processors are not practical at all. More specifically, mobile communications systems and other signal processing applications use longer codewords, meaning that the circuit has to employ more pipeline stages. This leads to the use of many flip-flops to adjust the operation timings at each stage. As more pipeline stages are needed, the number of flip-flops increases exponentially, requiring complex large-scale hardware.

SUMMARY OF THE INVENTION

Taking the above into consideration, an object of the present invention to provide an orthogonal transform processor which takes advantage of efficient pipelined processing without increasing the scale of its computation circuit.

To accomplish the above object, according to the present invention, there is provided an orthogonal transform processor which processes source data with an orthogonal transform algorithm. This processor comprises the following elements: a data reception unit which accepts a pair of source data values at intervals of T; an adder/subtractor, coupled to the data reception unit, which performs addition and subtraction of a given pair of data values at intervals of T/n, where n is an integer representing the order of the orthogonal transform algorithm being implemented; a storage unit which stores the resultant data values of the addition and subtraction at predetermined storage locations; a feedback unit which reads out the stored data values from the storage unit and feeds them back to the addition/subtraction unit; and a data output unit which reads out the data values stored as final result values in the storage unit, and sends out the final result values.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 is a diagram which describes the computational operation at the first stage when the code length is 16;

FIG. 8 is a diagram which describes the computational operation at the second stage when the code length is 16;

FIG. 9 is a diagram which describes the computational operation at the third stage when the code length is 16;

FIG. 10 is a diagram which describes the computational operation at the fourth stage when the code length is 16;

DESCRIPTION OF THE PREFERRED EMBODIMENTS

Preferred embodiments of the present invention will be described below with reference to the accompanying drawings.

Figure 1:
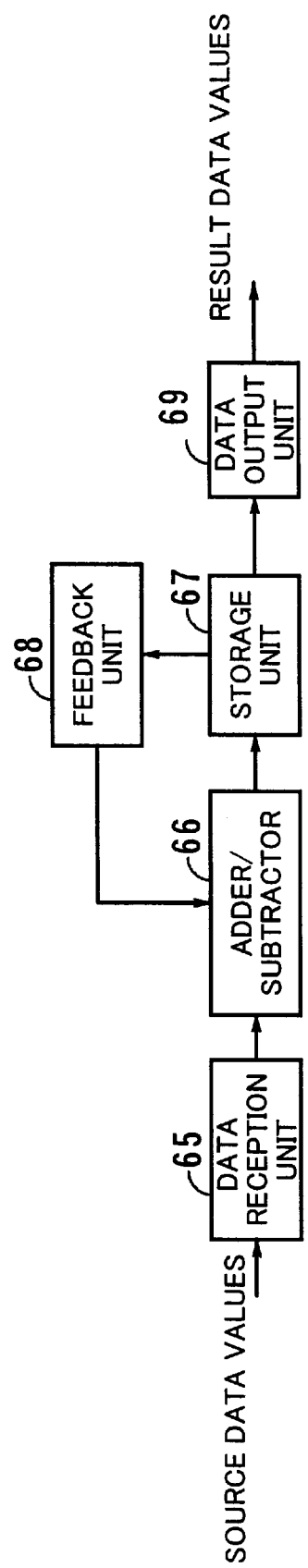
FIG. 1 is a conceptual view of the present invention.

FIG. 1 is a conceptual view of an orthogonal transform processor according to the present invention. This processor comprises the following elements: a data reception unit 65, an adder/subtractor 66, a storage unit 67, a feedback unit 68, and a data output unit 69.

The data reception unit 65 accepts a pair of source data values at intervals of T. For each source data pair supplied from the data reception unit 65, the adder/subtractor 66 performs addition and subtraction at intervals of T/n, where n is an integer representing the order of the orthogonal transform algorithm that is implemented. The storage unit 67 stores the resultant data values at predetermined storage locations. The feedback unit 68 reads out such data values from the storage unit 67 and feeds them back to the adder/subtractor 66, reordering their sequence as required. The data output unit 69 reads out the data values stored in the storage unit 67 and outputs them, reordering their sequence as required.

The above orthogonal transform processor operates as follows. Suppose, for example, that the data reception unit 65 has received a pair of source data values w0 and w1. The adder/subtractor 66 then calculates the following values by performing addition and subtraction.

$$w0'=w0+w1$$

$$w1'=w0-w1$$

The result values w0' and w1' are supplied to the storage unit 67 and saved into predetermined locations in its storage area. Another pair of source data values w2 and w3 are also supplied through the data reception unit 65 and processed in the same way, thus yielding the following values:

$$w2'=w2+w3$$

$$w3'=w2-w3$$

These two values are also saved into the storage unit 67 for later use.

The feedback unit 68 now retrieves w0' and w2' from the storage unit 67 and sends them back to the adder/subtractor 66. With the supplied data values w0' and w2', the adder/subtractor 66 calculates the following values and saves them into the storage unit 67.

$$w0''=w0'+w2'$$

$$w2''=w0'-w2'$$

The feedback unit 68 then retrieves w1' and w3' from the storage unit 67 and sends them back to the adder/subtractor 66. With those data values w1' and w3', the adder/subtractor 66 calculates the following values and saves them into the storage unit 67.

$$w1''=w1'+w3'$$

$$w3''=w1'-w3'$$

Finally, the data output unit 69 retrieves the data values w0", w1", w2", and w3" from the storage unit 67, and send them out in that order.

As seen from the above, the adder/subtractor 66 has to process both the source data values supplied from the data reception unit 65 and the feedback data values supplied from the feedback unit 68 without data conflict. To this end, the adder/subtractor 66 is designed to handle these data values by using time-division multiplexing techniques. That is, at a certain moment within a single clock cycle (T), the adder/subtractor 66 performs addition and subtraction for a given pair of source data values, while at another moment, it does the same for some previously processed data values fed back from the storage unit 67. The data values that have been repeatedly processed in this way are then extracted from the above multiplexed data stream and sent out through the data output unit 69.

According to the present invention, the proposed orthogonal transform processor is configured to keep intermediate results in a storage unit and use a time-sharing technique to process both newly entered data and previously process data virtually in a parallel fashion. This configuration enables orthogonal transform processes such as FHT to be implemented in a logic circuit of a reasonable scale.

The following section will describe a more specific embodiment of the present invention.

Figure 2:
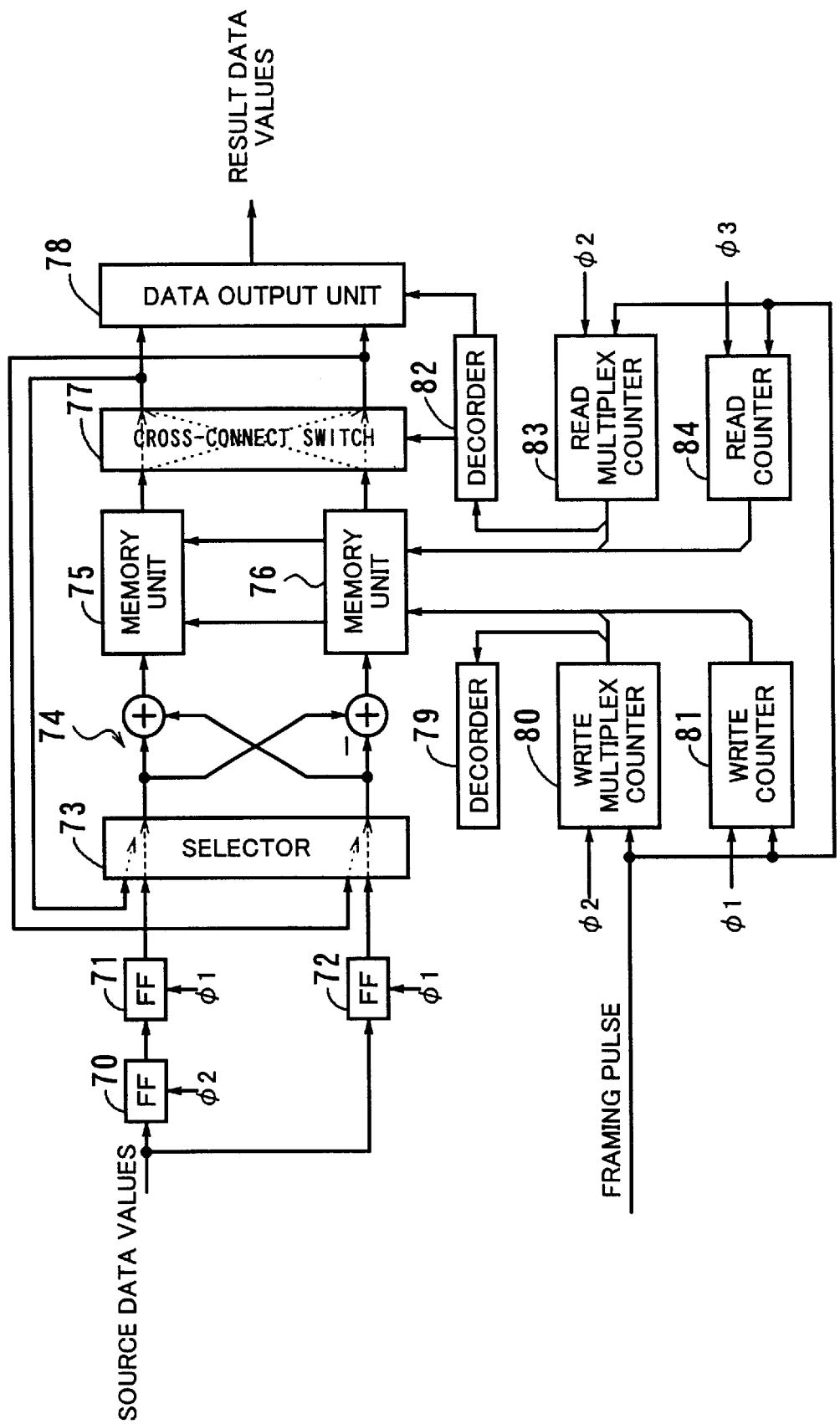
FIG. 2 is a block diagram of a preferred embodiment of the present invention.

FIG. 2 is a block diagram of a preferred embodiment of the present invention. This embodiment is an FHT processor comprising the following elements: flip-flops 70 to 72, a selector 73, a butterfly operator 74, memory units 75 and 76, a cross-connect switch 77, a data output unit 78, decoders 79 and 82, a write multiplex counter 80, a write counter 81, a read multiplex counter 83, and a read counter 84. Note that the illustrated FHT processor is designed to support a code length of four.

The proposed FHT processor operates on the basis of three in-phase clock systems $\phi 1$, $\phi 2$, and $\phi 3$ having different cycle intervals. The interval of clock $\phi 1$ is two times longer than that of clock $\phi 2$; the interval of clock $\phi 2$ is two times longer than that of clock $\phi 3$.

The flip-flop 70, placed at the front end of the FHT processor, delays the source data by one cycle interval of clock $\phi 2$, while the next flip-flops 71 and 72 delay their inputs by one cycle interval of clock $\phi 1$. The selector 73 is controlled by a command signal supplied from the decoder 79 in such a way that either the source data values or the feedback data values will be fed to the butterfly operator 74. Here, the term "feedback data values" refers to what are provided from the cross-connect switch 77. The butterfly operator 74 performs addition and subtraction for each pair of data values supplied from the selector 73. The memory units 75 and 76 save the results when they are supplied through the upper and lower output terminals of the butterfly operator 74, respectively. When saving those data, the memory units 75 and 76 receive an upper write address from the write multiplex counter 80 and a lower write address from the write counter 81, which designate a specific location in their respective storage areas.

Figure 3:
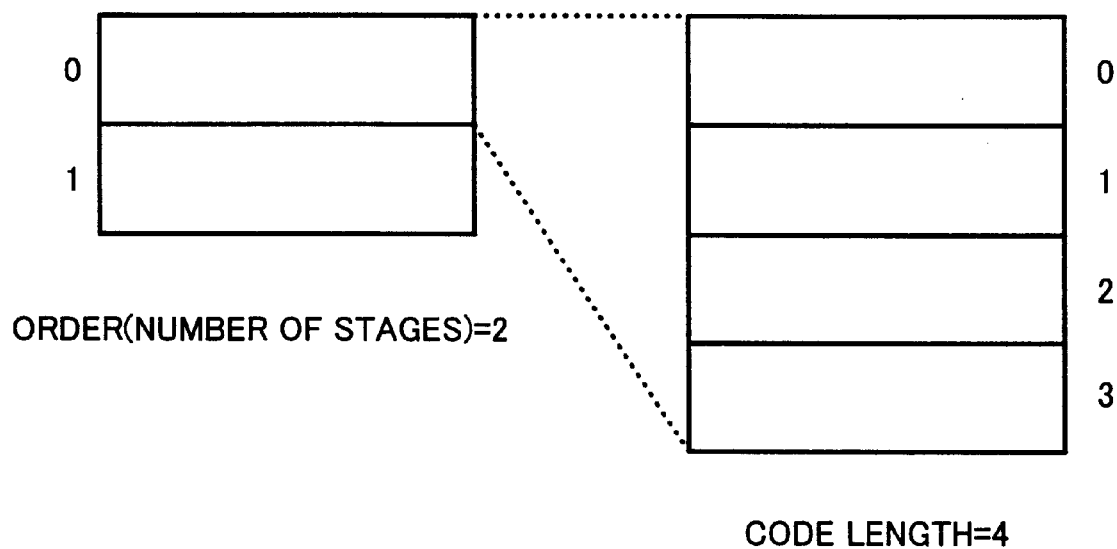
FIG. 3 is a diagram which shows an example of how the memory shown in FIG. 2 are divided and assigned.

FIG. 3 shows an example of how the storage space of the memory units 75 and 76 are allocated. As shown in the left half of FIG. 3, the storage space is divided into two areas: one for storing data values currently being processed, and the other for storing those that are previously entered and still being processed. The number of such areas is equal to the order of the FHT processor. The term "order" refers herein to the number of internal stages, i.e., the number of iterative butterfly operations required to yield a result. The order is two in the present example. The right hand of FIG. 3 shows that each of the above areas consists of as many data locations as the code length, which is four in the present example.

Referring back to FIG. 2, the cross-connect switch 77 is controlled by a command signal supplied from the decoder 82 so as to obtain an intended combination of data values read out of the memory units 75 and 76. The data output unit 78 outputs final result values of FHT computation, appropriately reordering them in accordance with to a command supplied from the decoder 82.

The decoder 79 produces a command signal to control the selector 73, according to the output of the write multiplex counter 80. The write multiplex counter 80 generates the upper write address for the memory units 75 and 76, based on the clock signal $\phi 2$ and framing pulse signal. The write counter 81, on the other hand, generates the lower write address, based on the clock signal $\phi 1$ and framing pulse signal. The generated upper and lower addresses are used when saving result values of each butterfly operation. In the rest of this description, the write address will be represented in the form of "n:m" where n and m are the upper and lower addresses expressed in decimal notation.

The decoder 82 produces command signals to control the cross-connect switch 77 and data output unit 78, according to the output of the read multiplex counter 83. The read multiplex counter 83 generates the upper read address for the memory units 75 and 76, based on the clock signal $\phi 2$ and framing pulse signal. The read counter 84, on the other hand, generates the lower read address, based on the clock signal $\phi 3$ and framing pulse signal. The generated upper and lower addresses are used when reading out the data stored in the memory units 75 and 76. The notation of the write address "n:m" will also apply to the read address in the rest of the description.

Referring next to the timing diagram of FIG. 4, the operation of the above-described FHT processor will be described below.

Figure 4:
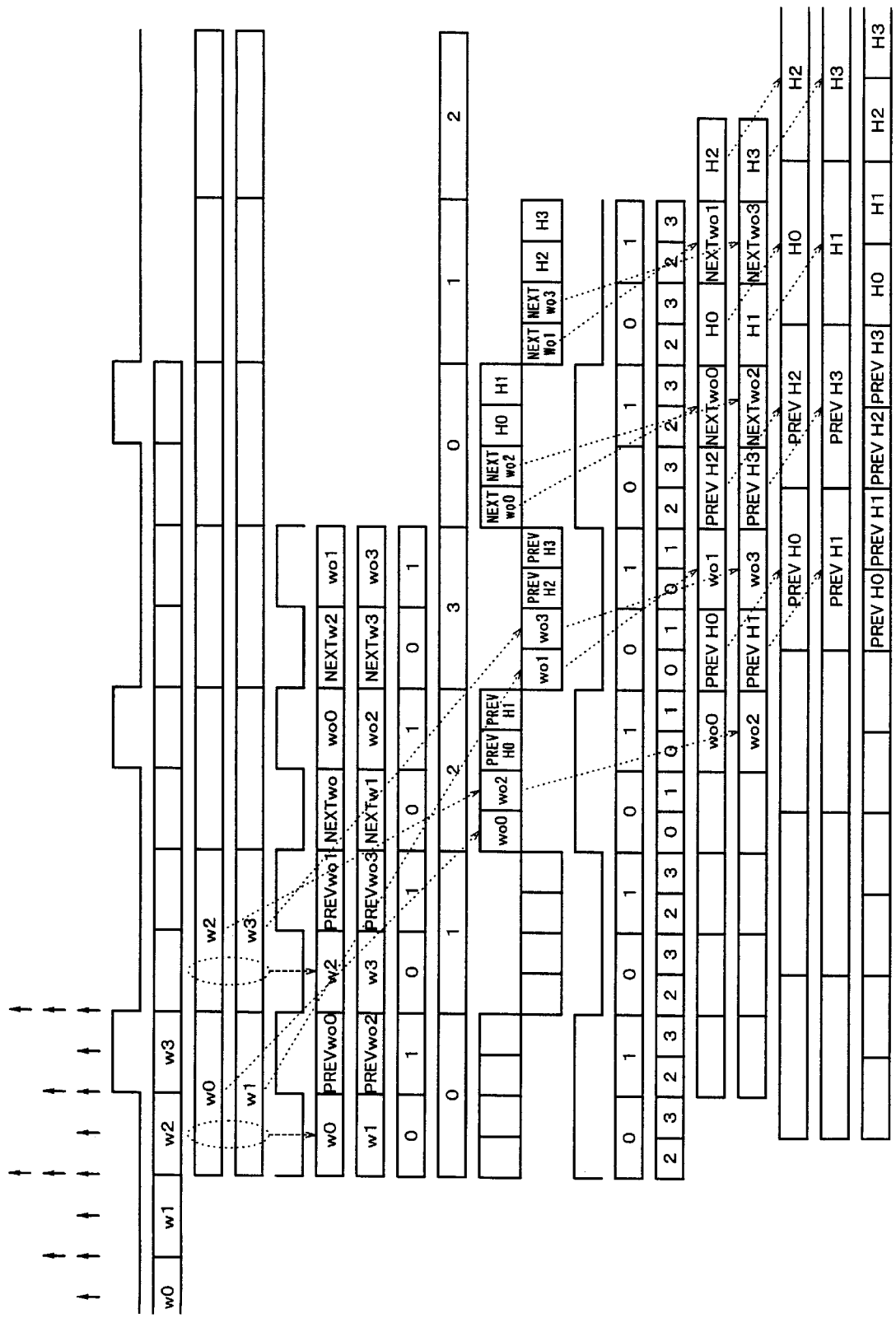
FIG. 4 is a timing diagram which shows how the embodiment of FIG. 2 operates.

Suppose that a series of source data values w0 to w3 are entered to the processor as shown in (E) of FIG. 4. These values are supplied to the flip-flops 70 and 72. Since it operates with the clock $\phi 2$ shown in (B), the flip-flop 70 delays the source data by one cycle interval of clock $\phi 2$. The other flip-flops 71 and 72 operate with the clock $\phi 1$ shown in (A). As a result, the first two source data values w0 and w1 reach the selector 73 at the same time, as shown in (F) and (G) of FIG. 4.

From the output of the write multiplex counter 80, the decoder 79 produces a selection command signal for the selector 73. This selection command signal is shown in (H) of FIG. 4. When it is low, the selector 73 chooses the output of the flip-flops 71 and 72. When the it is high, the selector 73 chooses the output of the cross-connect switch 77. In the present example, the selector 73 supplies the butterfly operator 74 with the source data values w0 and w1 being latched at the flip-flops 71 and 72, while the selection signal is low. The butterfly operator 74 then calculates their sum and difference, thus yielding the following intermediate results:

$$wo0 = w0 + w1$$

$$wo1 = w0 - w1$$

These values wo0 and wo1 are then written into the memory units 75 and 76, respectively. In this write operation, a write address "0:0" is supplied to the memory units 75 and 76, because both the write multiplex counter 80 and write counter 81 output "0" as shown in (K) and (L) of FIG. 4.

In a similar manner, the next two source data values w2 and w3 are supplied to the butterfly operator 74 through the selector 73 when the write counter 81 outputs "1" as shown in (L) of FIG. 4. The butterfly operator 74 produces the following intermediate results:

$$wo2 = w2 + w3$$

$$wo3 = w2 - w3$$

These values wo2 and wo3 are sent to the address "0:1" of the memory units 75 and 76, respectively.

The four intermediate values wo0 to wo3 will be read out of the memory units 75 and 76 and subjected to the second stage as follows. First, the data values wo0 and wo2 are retrieved from the memory unit 75 during the period when the following two conditions are both met: (a) the write counter 81 outputs "2" (see (L) of FIG. 4); (b) the read address is "0:0" or "0:1" (see (O) and (P) of FIG. 4). This read-out operation is depicted in (M) of FIG. 4. The retrieved data are then retimed and rearranged by the cross-connect switch 77 in such a way that wo0 and wo2 will appear at its upper and lower output terminals, respectively, as shown in (Q) and (R). Accordingly, those two values wo0 and wo2 reach the selector 73.

While FIG. 2 does not indicate it explicitly, there is a control signal that determines which memory unit should be selected as the data source, the waveform of which is shown in (N) of FIG. 4. When this signal is high, the memory unit 75 is selected. When it is low, the other memory unit 76 is selected.

Referring again to (I) and (J) of FIG. 4, the selector 73 supplies wo0 and wo2 to the butterfly operator 74, thus yielding their sum and difference as follows.

$$H0=wo0+wo2$$

$$H2=wo0-wo2$$

These two values are part of the final result values of FHT. At this stage, however, H0 and H2 are written into the address "1:2" of the memory units 75 and 76, respectively.

Subsequently, the remaining two intermediate data values wo1 and wo3 are retrieved from the memory unit 76 when the following two conditions are both met: (a) the write counter 81 outputs "3" (see (L) of FIG. 4); (b) the read address is "0:0" or "0:1" (see (O) and (P) of FIG. 4). This read operation is depicted in (M) of FIG. 4. The retrieved data wo1 and wo3 are then retimed and rearranged by the cross-connect switch 77 in such a way that wo1 and wo3 will appear at its upper and lower output terminals, respectively, as shown in (Q) and (R). Accordingly, wo1 and wo3 reach the feedback input terminals of the selector 73. The selector 73 then supplies wo1 and wo3 to the butterfly operator 74, thus yielding their sum and difference as follows.

$$H1=wo1+wo3$$

$$H3=wo1-wo3$$

These are the remaining result values of FHT. At this stage, H1 and H3 are written into the address "1:3" of the memory units 75 and 76, respectively.

In parallel with the above operations, the next set of source data values w0 to w3 are entered to the FHT processor during the period when the write counter 81 outputs "2" or "3" (see (L) of FIG. 4) and the write multiplex counter 80 outputs "0" (in other words, when the selector 73 is selecting the flip-flops 71 and 72).

As a result of the above two butterfly operations, all the final result values H0 to H3 are now available in the memory unit 75 and 76, and the FHT processor is ready to output them. Actually, the first two values H0 and H1 are read out of the memory unit 75 during the period when the following two conditions are both met: (a) the write counter 81 outputs the second instance of "0" (see (L) of FIG. 4); and (b) the read address is either "1:2" or "1:3." The cross-connect switch 77 then retimes and rearranges them in such a way that H0 and H1 will appear at its upper and lower output terminals, respectively, as shown in (Q) and (R) of FIG. 4. Finally, these two result values are supplied to the data output unit 78.

In a similar manner, the remaining two result values H2 and H3 are read out of the memory unit 76 during the period when the following two conditions are both met: (a) the write counter 81 outputs the second instance of "1" (see (L) of FIG. 4); and (b) the read address is either "1:2" or "1:3." The cross-connect switch 77 then retimes and rearranges them in such a way that H2 and H3 will appear at its upper and lower output terminals, respectively, as shown in (Q) and (R) of FIG. 4. Finally, these two result values are supplied to the data output unit 78. The data output unit 78 receives H0 to H3 and outputs them serially as shown in (U) of FIG. 4. In this way, the four result values H0, H1, H2, and H3 are sent out in that order.

The above-described preferred embodiment exploits a time-division multiplexing technique in FHT processing. That is, a single butterfly operator is used repetitively at multiple operation stages. This proposed architecture eliminates the need for any additional operators or extra flip-flops to realize a higher-order transform, meaning that the required computational functions can be implemented in a smaller circuit.

The embodiment has been described so far under the assumption that the code length is four. It is not intended, however, to limit the invention to this specific example. Rather, the present invention can be applied to longer code lengths. To demonstrate the versatility of the FHT processor architecture of FIG. 2, the next section will present a more complex example, in which the code length is 16, and each source data value is 8-bit wide.

Since the code length is 16, the order of the FHT operations (i.e., the number of operation stages) should be four. Every source data value, which is a bipolar signal expressed in 8-bit two's complement form, will pass through the butterfly operator 74 four times. For this reason, the butterfly operator 74 has to perform addition and subtraction with 12-bit (=8+4) resolution, and accordingly, the memory units 75 and 76 should be 12-bit wide.

As just stated above, the FHT processor executes the computation at four stages. In other words, the multiplexing level of the butterfly operator 74 is four. That is, each memory unit 75 and 76 has to provide enough storage space to accommodate all intermediate results for four-stage operations. This also means that the write and read multiplex counters 80 and 83 should be 2-bit counters.

The write counter 81 and read counter 84, on the other hand, should be three-bit counters. These two counters count the number of butterfly operations performed at each stage. This number is eight, a half of the code length "16," meaning that three-bit counters are needed.

Figure 5:
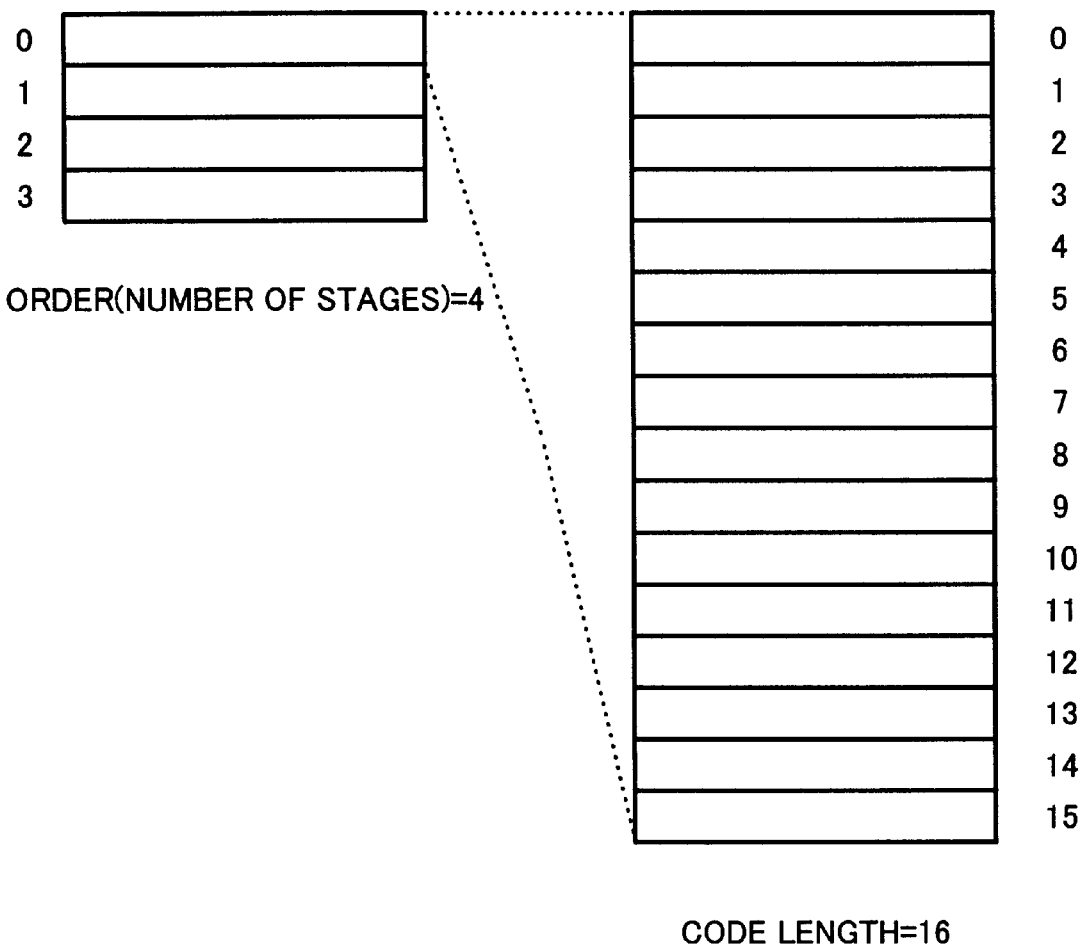
FIG. 5 is a diagram which shows an example of memory space allocation when the code length is 16.

FIG. 5 shows how the memory units 75 and 76 are partitioned when the code length is 16. As seen from FIG. 5, the memory space is divided into four areas, which correspond to the order of FHT operations. Each area contains 16 data locations, which correspond to the code length.

The proposed computation process is relatively complicated. Before focusing on the detailed operation of the present embodiment, a conventional pipelined process will be explained with reference to FIG. 6, which must be useful in the understanding of the invention.

Figure 6:
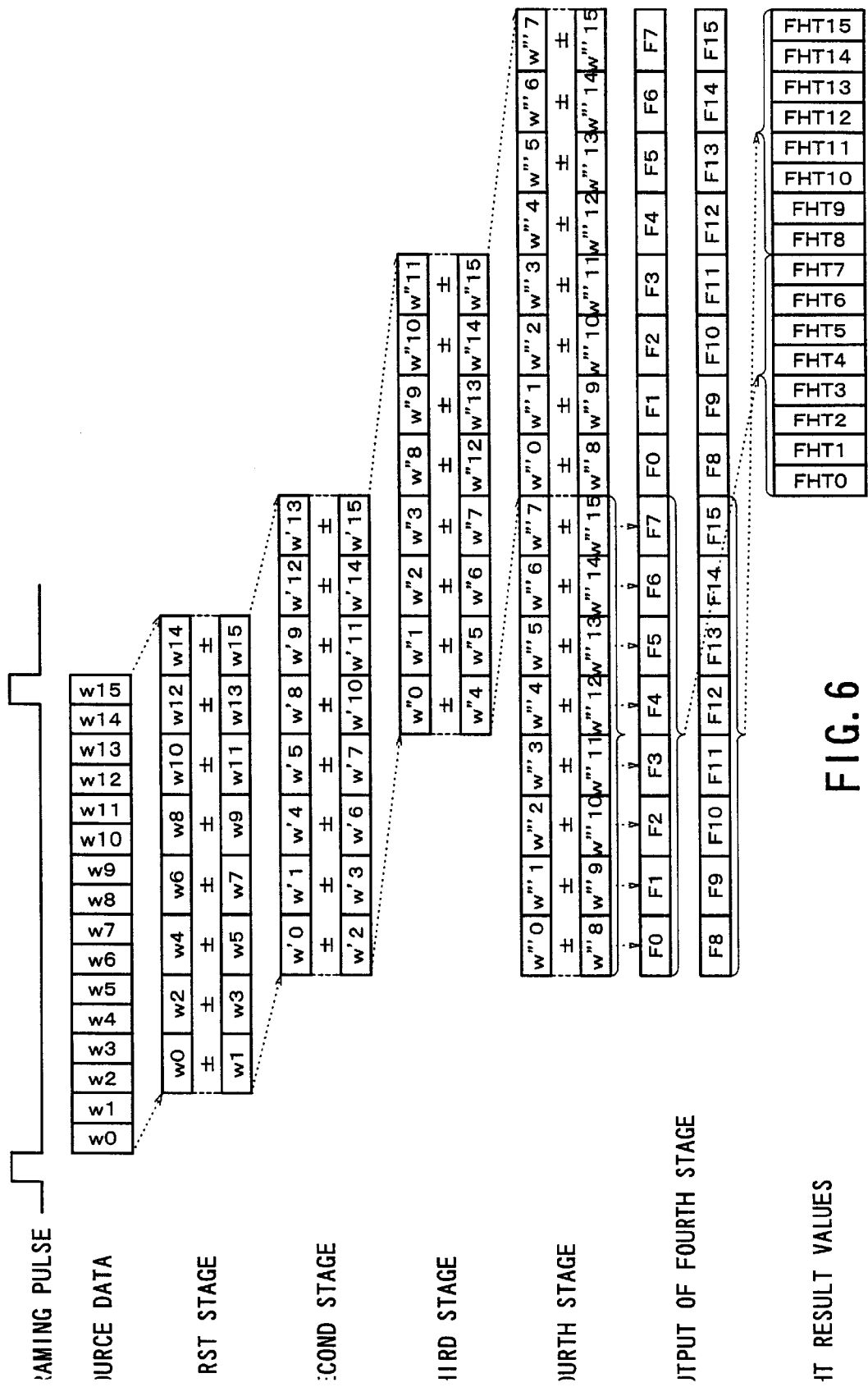
FIG. 6 is a timing diagram which explains an example of pipelined processing when the code length is

Referring to (A) and (B) of FIG. 6, a series of source data values w0 to w15 are entered to the processor in synchronization with the framing pulse signal. At the first stage, the odd-numbered values and even-numbered values are subjected to the butterfly operations, thus yielding their sums and differences as shown in (C). These intermediate results are shown as w'0 to w'15, the details of which are provided in FIG. 7.

At the second stage, the following data pairs are subjected to the butterfly operation (i.e., addition and subtraction) as shown in (D) of FIG. 6: w'0 and w'2, w'1 and w'3, w'4 and w'6, w'5 and w'7, w'8 and w'10, w'9 and w'11, w'12 and w'14, and w'13 and w'15. This stage yields the second intermediate results w"0 to w"15, the details of which are provided in FIG. 8.

At the third stage, the following data pairs are subjected to the butterfly operation as shown in (E) of FIG. 6: w"0 and w"4, w'"1 and w"5, w"2 and w"6, w"3 and w"7, w"8 and w"12, w"9 and w"3, w"10 and w"14, and w"11 and w"15. This stage yields the third intermediate results w'"0 to w'"15, the details of which are provided in FIG. 9.

At the fourth stage, the following data pairs are subjected to the butterfly operation as shown in (F) of FIG. 6: w'"0 and w'"8, w'"1 and w'"9, w'"2 and w'"10, w'"3 and w'"11, w'"4 and w'"12, w'"5 and w'"13, w'"6 and w'"14, and w'"7 and w'"15. This stage yields the final results F0 to F15, as shown in (G) of FIG. 6. Their details are provided in FIG. 10, where Fn equals FHTn (n=0 . . . 15). The result values are then reordered and sent out as a linear sequence of FHT0 to FHT15 as shown in (H) of FIG. 6.

In this way, the conventional processor processes sixteen source data values through the four-stage pipelined operations shown in FIGS. 7 to 10, passing intermediate results from one stage to another. Note that the four pipelined operation frames are arranged in a "staggered" fashion, because each stage cannot start until necessary data is finished at the previous stage. For example, the calculation of FHT0 at the last stage cannot start until the input data values w'"0 and w'"8 are supplied from the third stage.

Figure 11:
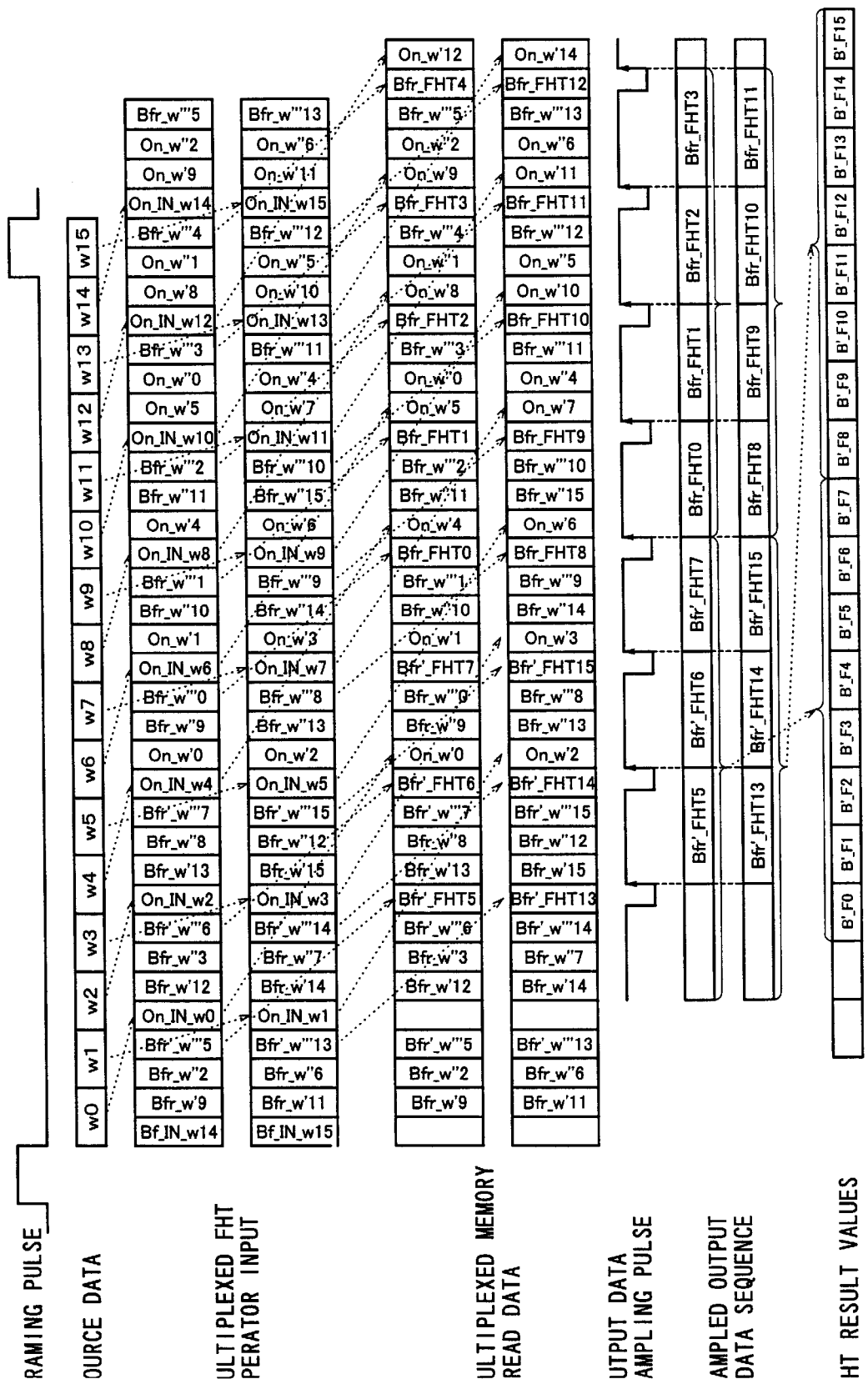
FIG. 11 is a timing diagram which shows how the embodiment of FIG. 2 operates when the code length is 16.
Figure 12:
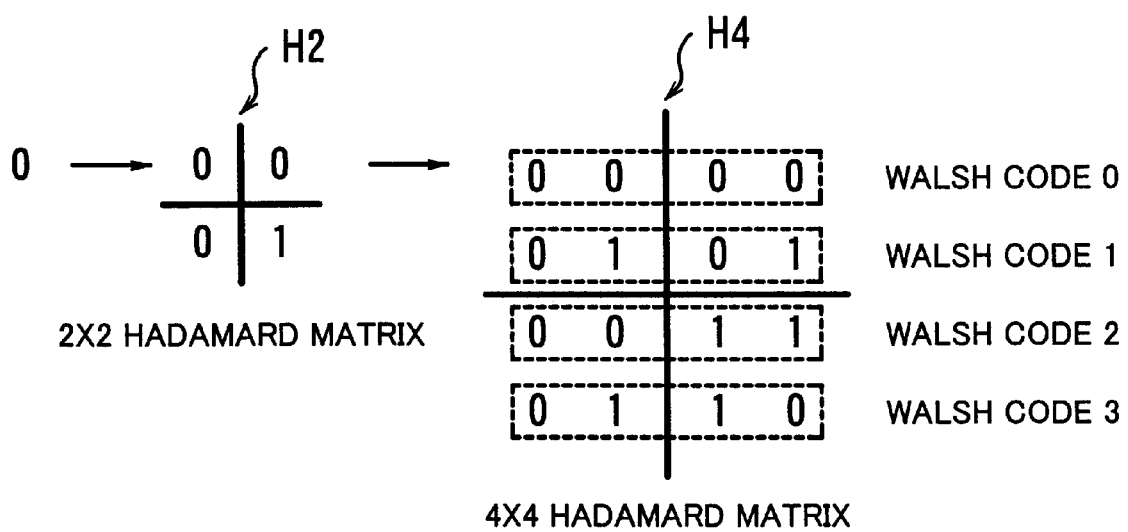
FIG. 12 is a diagram which shows how to generate Hadamard matrices.
Figure 13:
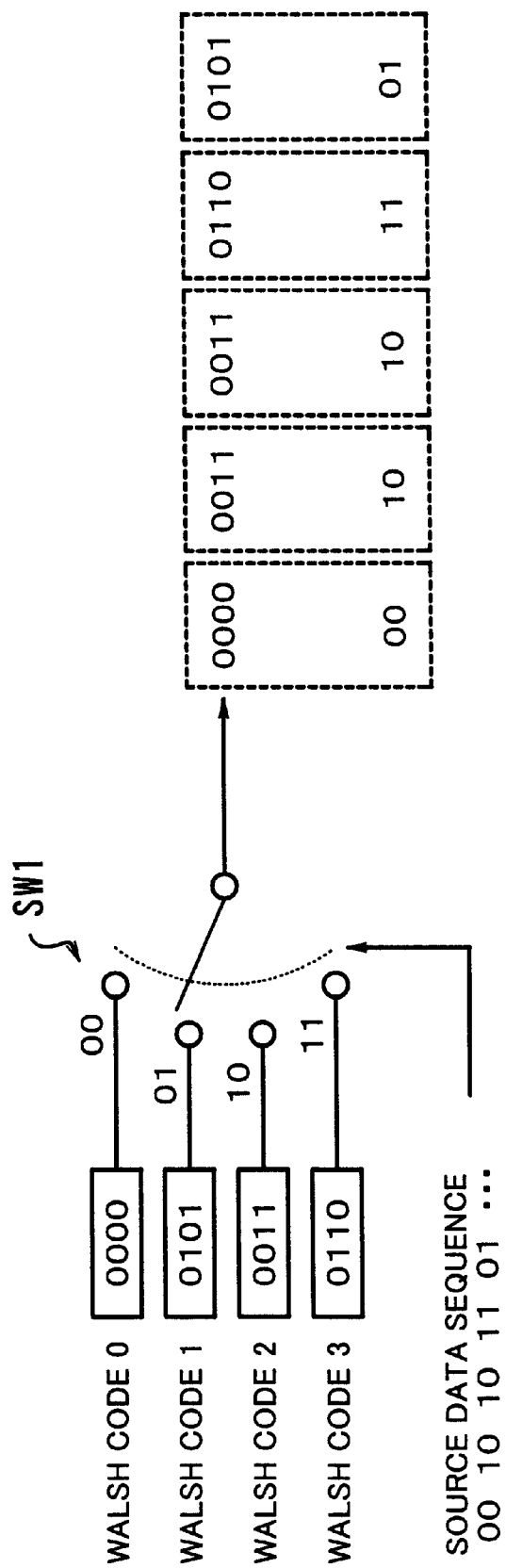
FIG. 13 is a diagram which shows an example of an M-ary orthogonal modulator which uses Walsh codes of M=4.
Figure 14:
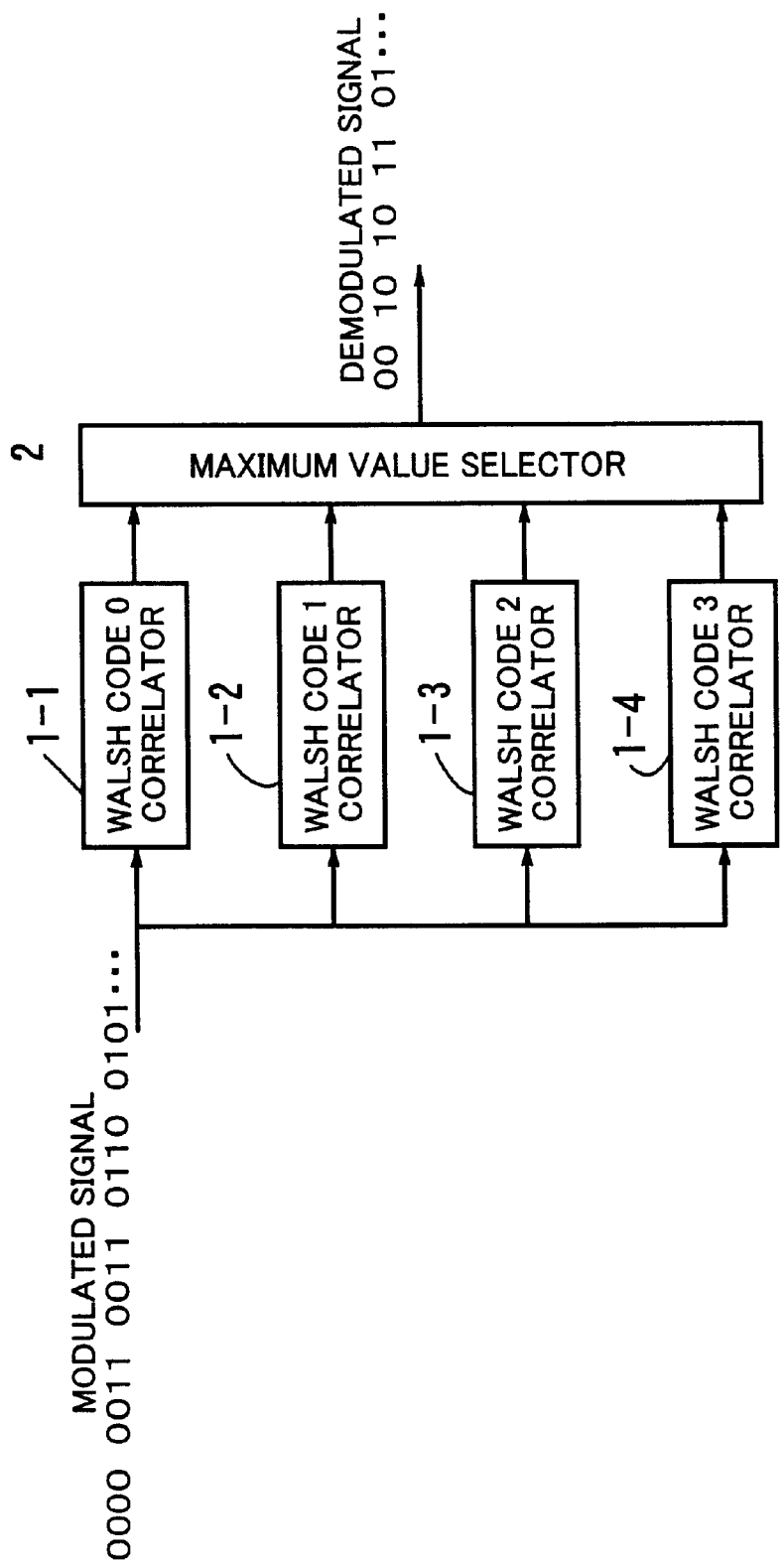
FIG. 14 is a diagram which shows an example of a conventional Walsh decoder.
Figure 15:
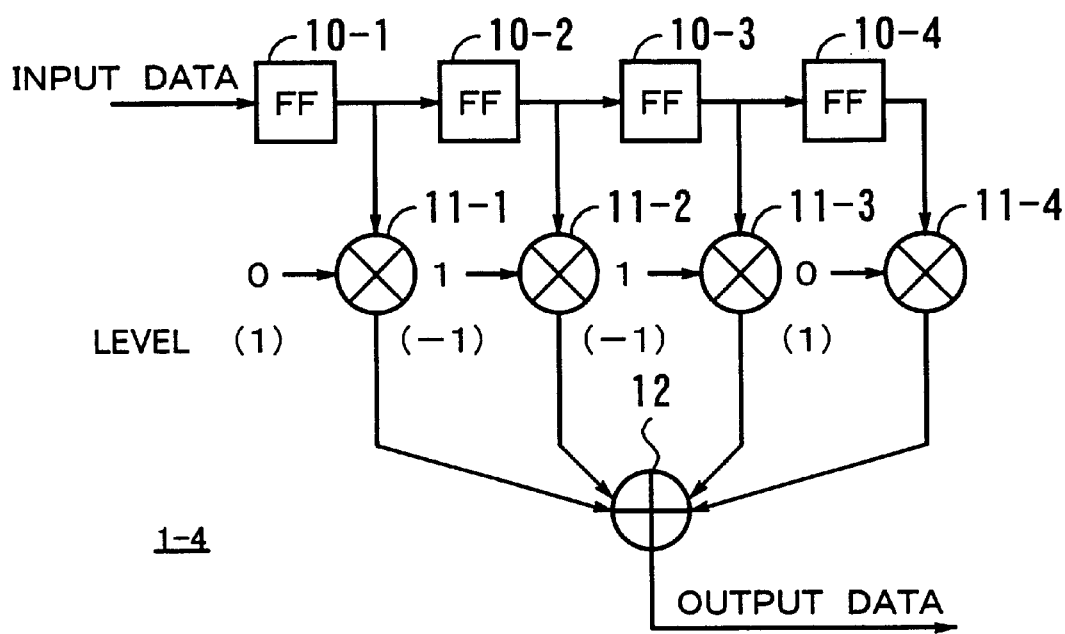
FIG. 15 is a diagram which shows the structure of the correlator for Walsh code 3 shown in FIG. 14.
Figure 16A:
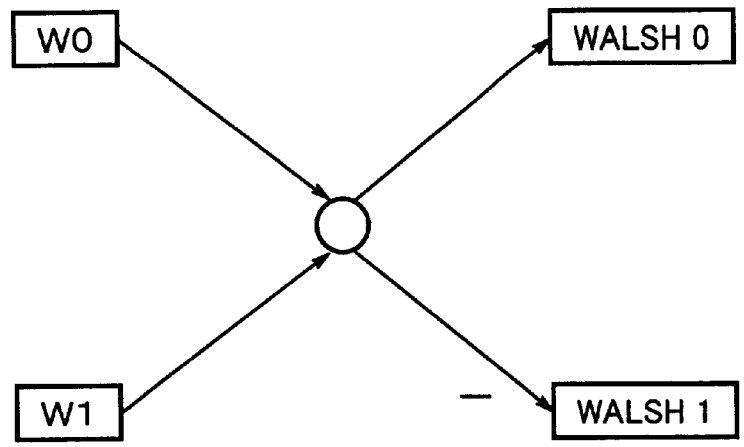
FIG. 16(A) is a signal flow diagram which shows the FHT computation for 2×2 Hadamard matrix.
Figure 16B:
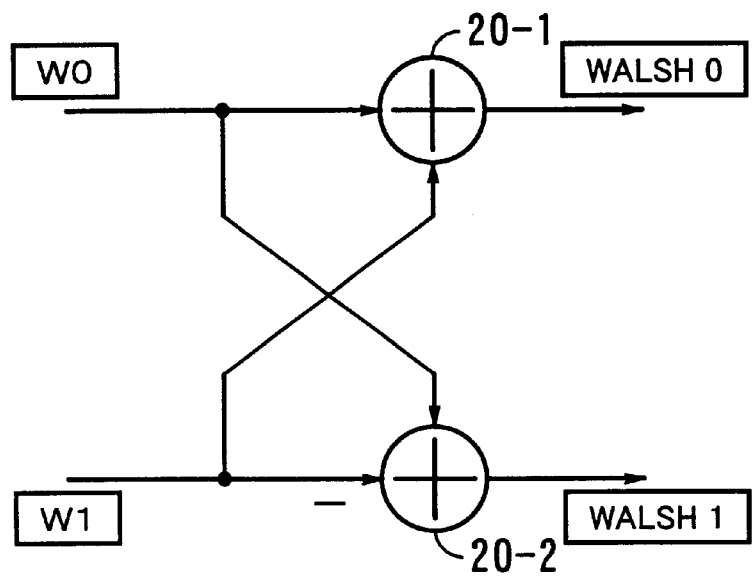
FIG. 16(B) is a block diagram of an FHT processor which implements the signal flow of FIG. 16(A)
Figure 17:
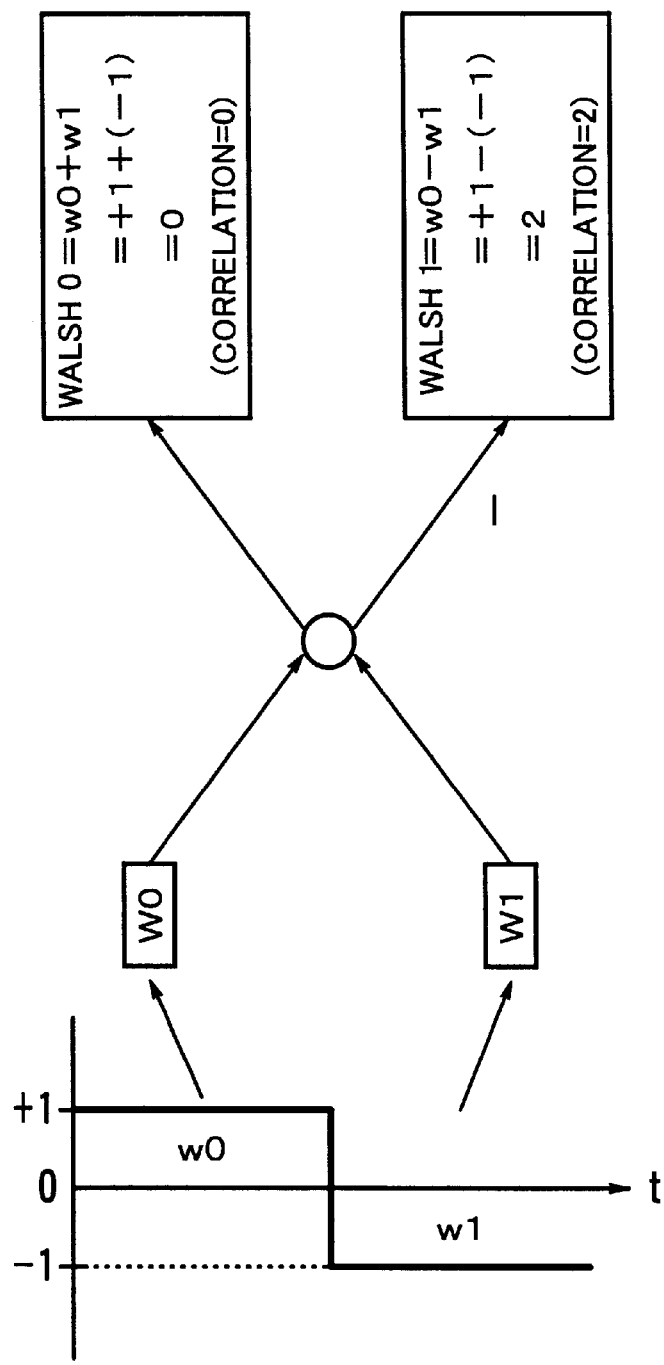
FIG. 17 is a diagram which shows how Walsh code 1 is handled in the signal flow diagram of FIG. 16(A) when it is supplied as source data.
Figure 18:
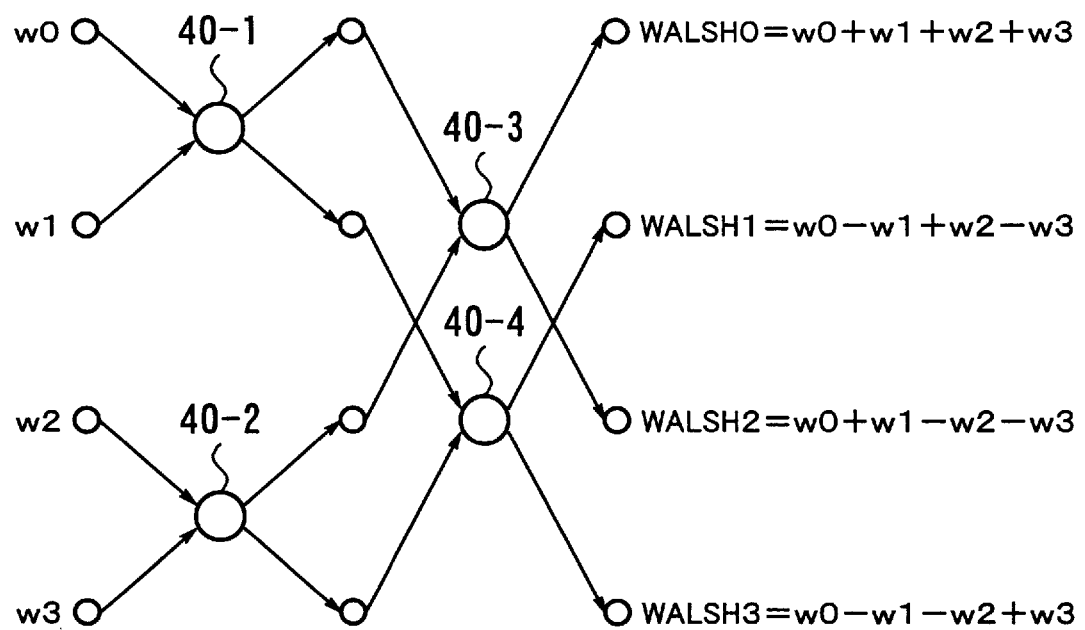
FIG. 18 is a signal flow diagram showing the FHT computation for 4×4 Hadamard matrix.
Figure 19:
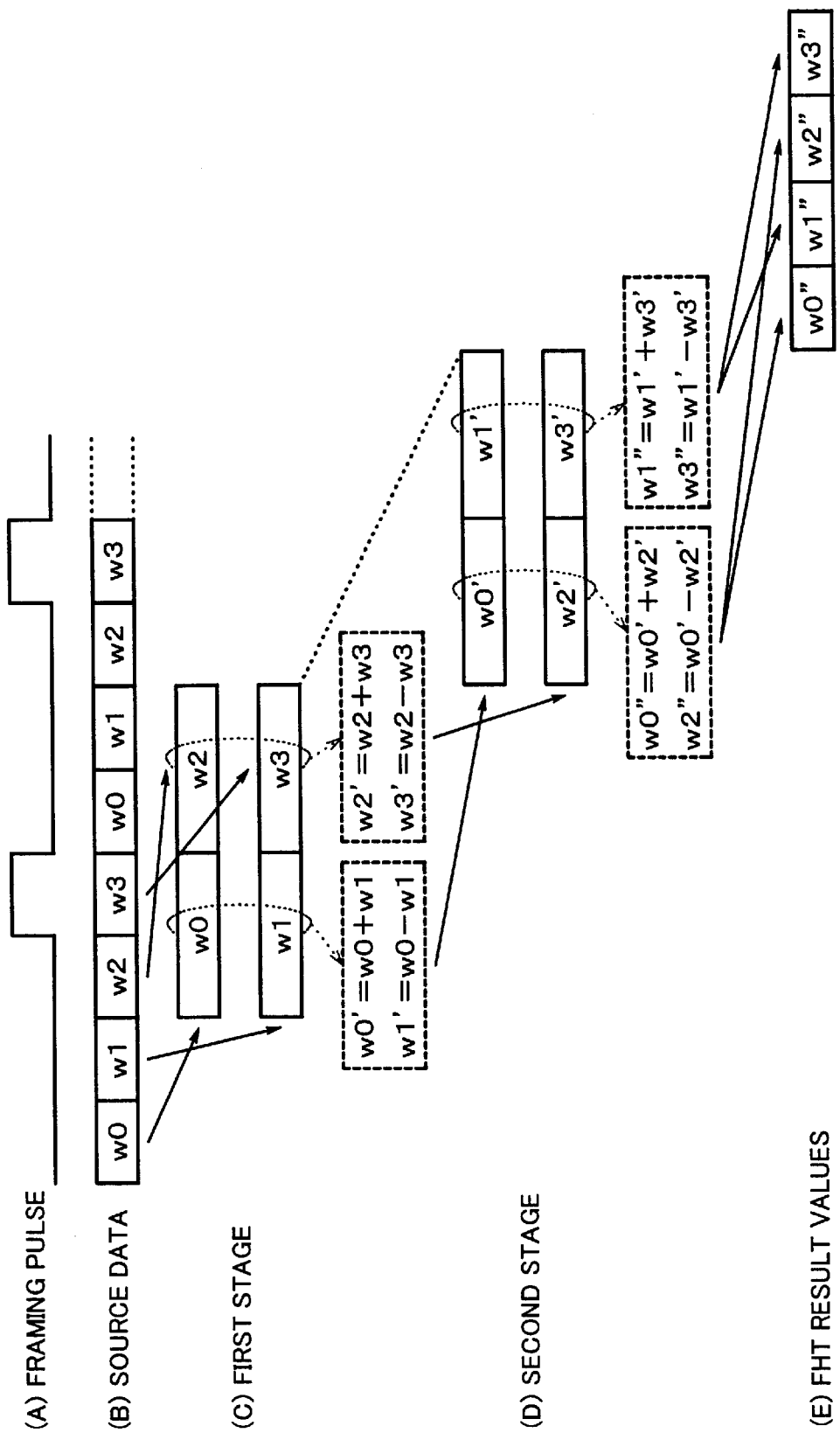
FIG. 19 is a timing diagram of pipelined processing when the code length is four.
Figure 20:
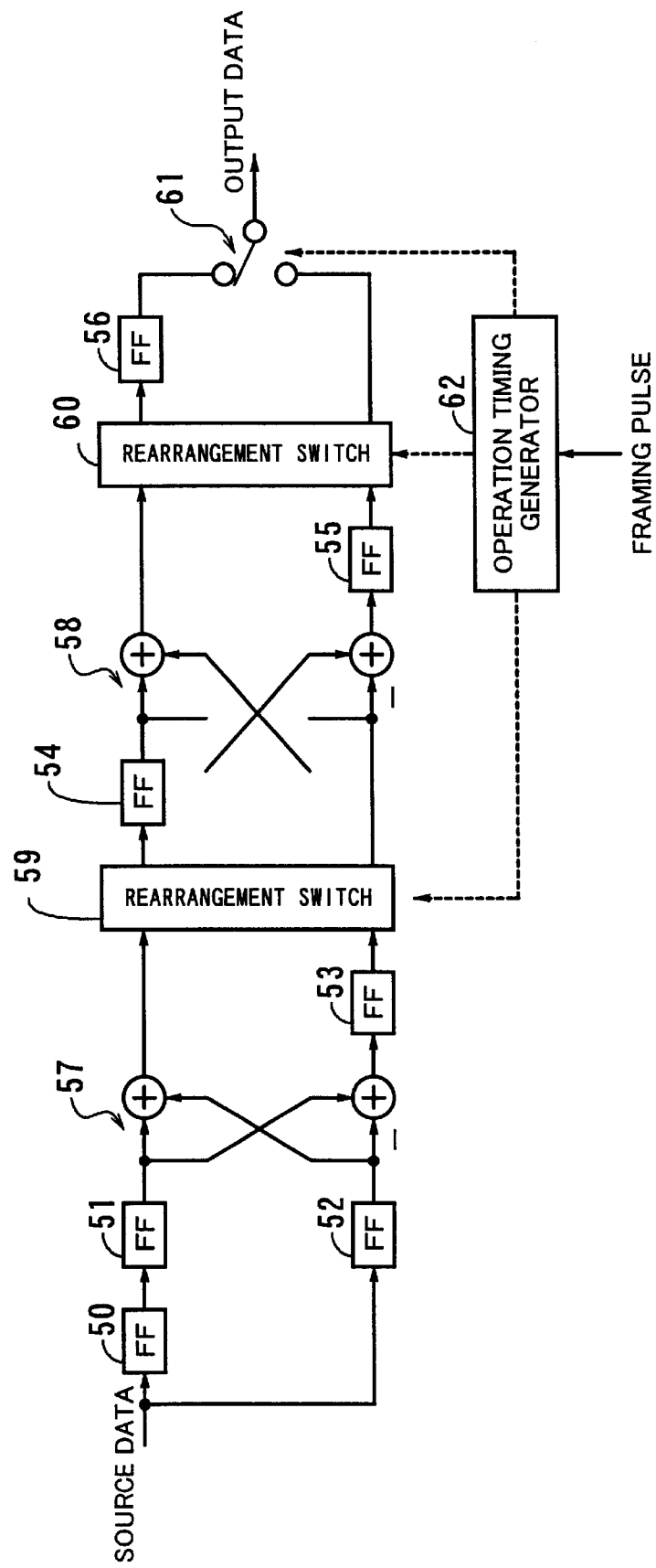
FIG. 20 is a block diagram of hardware which realizes the pipelined processing shown in FIG. 18.

Referring now to FIG. 11, the next section will describe how the FHT processor of FIG. 2 operates when the code length is 16. In the timing diagram of FIG. 11, the following notation is used.

On: data of the current frame

IN: source data

Bfr: data of the previous frame

Bfr': data of two frames before the current frame w', w", w'": intermediate results of butterfly operation at the first, second, and third stages FHT: output data (i.e., final result)

B': short form of Bfr'

T: short form of FHT

For instance, On_IN_w0 to On_IN_w15 are source data values of the currently processed frame. Bfr_w'0 to Bfr_w'15 are the first-stage results of the previous frame. Bfr_w"0 to Bfr_w"15 are the second-stage results of the previous frame. Bfr_w'"0 to Bfr_'"15 are the third-stage results of the previous frame. Bfr'_w'0 to Bfr'w'15 are the first-stage results of two frames before the current frame. Bfr_FHT0 to Bfr_FHT15 are the final result values of the previous frame.

Referring to (A) and (B) of FIG. 11, a series of source data values w0 to w15 are entered to the processor in synchronization with the framing pulse signal. These values are delayed and retimed by the flip-flops 70 to 72, so that they are supplied to the butterfly operator 74 in pairs (e.g., w0 and w1, w2 and w3). As shown in (C), the current source data values w0 to w15 appear as On_IN_w0 to On_IN_w15 in the multiplexed input data streams to the butterfly operator 74.

The outputs of the butterfly operator 74 at the first stage are then saved into the memory units 75 and 76, which are referred to as On_w'0 to On_w'15. They are read out and supplied back to the butterfly operator 74 through the selector 73, when the read multiplex counter 83 and read counter 84 output predetermined count values. Take the values On_w'0 and On_w'2, for example. As shown in (D), this pair of feedback values are read out of the memory units 75 and 76 during the time when the source data value w6 is entered. They are supplied to the butterfly operator 74 through the cross-connect switch 77 and selector 73, as shown in (C). The second-stage intermediate result values On_w"0 and On_w"2 are saved into the memory units 75 and 76. The same process applies to other values, resulting in the second-stage intermediate results On_w"0 to On_w"15 in the memory units 75 and 76.

On_w"0 to On_w"15 are read out and supplied back to the butterfly operator 74 via the selector 73, when the read multiplex counter 83 and read counter 84 output predetermined count values. Still another butterfly operation is applied to them, resulting in the third-stage intermediate results On_w'"0 to On_w'"15 in the memory units 75 and 76.

On_w'"0 to On_w'"15 are read out and supplied back to the butterfly operator 74. Yet another butterfly operation is applied to them, resulting in the final results On_FHT0 to On_FHT15 in the memory units 75 and 76. When the read multiplex counter 83 and read counter 84 output predetermined count values, these result values On_FHT0 to On_FHT15 read out and supplied to the data output unit 78 through the cross-connect switch 77. The data output unit 78 picks up them in synchronization with the output data sampling pulse shown in (E), which is supplied from the decoder 82. The resultant data streams are shown in (F), although they are of the preceding two frames. They are rearranged and retimed in the data output unit 78 and sent out as the final result values FHT0 to FHT15 in this order. FIG. 11 shows such values Bfr'_FHT0 to Bfr'_FHT15 (identical to B'_F0 to B'_F15) in the part (G), although they are the results of a past frame.

As seen from the above explanation, the proposed architecture of FHT processors can be adapted to any code lengths, by setting an appropriate bus width and memory capacity. The proposed processor requires only one single butterfly operator, regardless of the code length, as well as taking advantage of compact memory devices instead of using discrete flip-flops for timing adjustment. This simplicity contributes to the miniaturization of processor hardware. The proposed architecture also provides high-speed computation since its operation timings and latency are similar to the conventional ones.

While the above description of the preferred embodiment has discussed the FHT processor architecture, it is not intended to limit the invention to such FHT applications. Those skilled in the art will appreciate that the proposed architecture are applicable to other orthogonal transform algorithms such as the FFT. Even in that case, the embodiment shown in FIG. 2 can be used without any substantial modification.

The above discussion is summarized as follows. According to the present invention, the proposed orthogonal transform processor is configured as follows. The data reception unit accepts a pair of source data values at intervals of T, and it supplies them to the adder/subtractor to performs addition and subtraction at intervals of T/n, where n is an integer representing the order of the orthogonal transform being implemented. The resultant data values are supplied to the storage unit and stored into predetermined storage locations. A feedback unit reads out such stored data values from the storage unit and feeds them back to the adder/subtractor. When the intended computation is finished, a data output unit reads out the final result values from the storage unit and sends them out. This configuration contributes to the miniaturization of orthogonal transform processors.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An orthogonal transform processor which processes source data with an orthogonal transform algorithm, comprising:

data reception means for accepting a pair of source data values at intervals of T;

addition/subtraction means, coupled to said data reception means, for performing addition and subtraction of a given pair of data values at intervals of T/n, where n is an integer representing the order of the orthogonal transform algorithm being implemented;

storage means for storing the resultant data values of the addition and subtraction at predetermined storage locations;

feedback means for reading out the stored data values from said storage means and feeding the read data values back to said addition/subtraction means; and data output means for reading out the data values stored as final result values in said storage means, and sending out the final result values.

2. The orthogonal transform processor according to claim 1, wherein said storage means has a plurality of data locations to save the resultant data values supplied from the addition/subtraction means, the number of data locations being determined in accordance with the number of operation stages.

3. The orthogonal transform processor according to claim 1, wherein said data output means reorders the data values read out of said storage means.

4. The orthogonal transform processor according to claim 1, wherein said data reception means receives a series of source data values at intervals of T/2 and rearranges the received values into pairs at intervals of T to feed said addition/subtraction means.

* * * * *